United States Patent [19]

Shorr

[11] 4,014,787
[45] Mar. 29, 1977

[54] WASTEWATER TREATMENT

[75] Inventor: Jacob Shorr, Lexington, Mass.

[73] Assignee: Systems Engineering & Manufacturing Corporation, Stoughton, Mass.

[22] Filed: Sept. 5, 1975

[21] Appl. No.: 610,688

Related U.S. Application Data

[63] Continuation-in-part of Ser. No. 429,510, Jan. 2, 1974, abandoned.

[52] U.S. Cl. .......................... 210/23 F; 210/433 M
[51] Int. Cl.² ....................................... B01D 13/00
[58] Field of Search ....... 210/73, 23 F, 321, 433 M

[56] References Cited

UNITED STATES PATENTS 3,677,405  7/1972  Keith, Jr. ...................... 210/73 X

OTHER PUBLICATIONS

Michaels, "New Separation Technique for the CPI", from *Chem. Eng. Progress*, vol. 64, No. 12, Dec., 1968, pp. 31–43.

*Primary Examiner*—Frank A. Spear, Jr.
*Attorney, Agent, or Firm*—Wolf, Greenfield & Sacks

[57] ABSTRACT

A method of removing soluble and insoluble small particle size materials from wastewater by binding the small particle size material with a combining agent to form soluble and/or insoluble bound materials having a particle size sufficiently large to permit filtration of the wastewater with removal of the bound materials. The method is preferably carried out to remove heavy metals and other materials from metal plating and finishing wastewater to allow recovery and reuse of the water in plating and finishing operations and/or permit recovery and salvaging of the metals normally carried by the wastewater.

24 Claims, 1 Drawing Figure

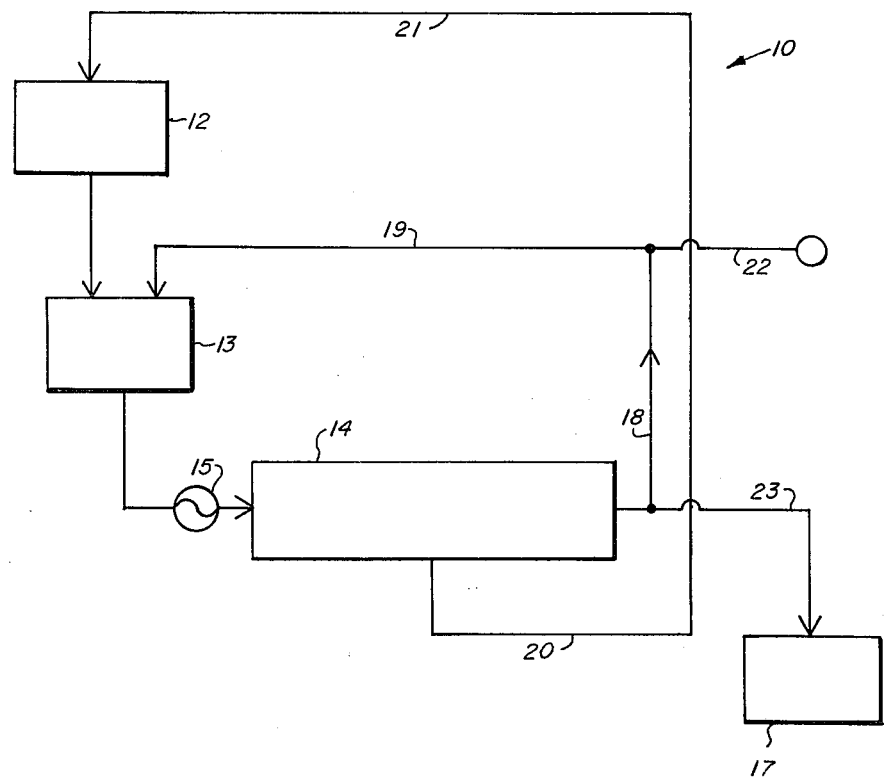

WASTEWATER TREATMENT

RELATED APPLICATION

This application is a continuation-in-part of applicant's copending application Ser. No. 429,510, filed Jan. 2, 1974, now abandoned.

BACKGROUND OF THE INVENTION

In many industrial processes, wastewater is created having high concentrations of heavy metal ions and other contaminant materials such as various anions and cations including fluorides, cyanides and hexavalent chrome. Because of the high concentration of heavy metals and other contaminant materials, the water cannot be recycled in many industrial procedures and moreover cannot be discharged to environmental outlets because of the pollutant effect of such heavy metal ions and/or other contaminant materials. In the metal finishing industry, the Environmental Protection Agency has set certain tentative discharge limits for maximum amounts of heavy metal ions which can remain in water discharged to the environment. The industry has attempted to meet the pollutant problem by several long known and other recently developed methods. In one often used method, wastewater containing heavy metal ions and other contaminant materials resulting from metal finishing rinses, is treated with an alkaline or acid material to adjust the pH and form insoluble hydroxides or other precipitates of the metals. The insoluble hydroxides or other precipitates are then separated from the wastewater. A problem here is that many of the heavy metal ions and other contaminant materials are soluble to some extent even in their hydroxide or precipitated form, thus wastewater so treated often still carries undesirably high levels of certain metal ions. In a more recent development, ion exchange methods have been employed to remove heavy metal ions and other contaminant materials. However, such methods are often expensive and complex. Other problems arise with the use of reverse osmosis techniques. High concentrations and high pressures are part of reverse osmosis operational problems. Reverse osmosis is limited to approximately 2000 parts per million (ppm) concentration and efficiency of the process is inversely proportional to the concentration.

It was believed in the art that, heavy metal hydroxides tend to form a gelatinous precipitate and thus block filter membranes by penetration into filter pores or by building a continuous gelatinous precipitate on top of a membrane face area. Thus the art often removes and avoids use of heavy metal hydroxides in filtering procedures in order to avoid the known clogging problems.

SUMMARY OF THE INVENTION

It is an important object of this invention to provide a method of treating wastewater to efficiently remove materials therefrom permitting recovery of such materials and/or reuse or discharge of the treated water.

It is still another object of this invention to provide a method in accordance with the preceding object which can be rapidly carried out at practical cost in commercial procedures.

It is still another object of this invention to provide a substantially two step process which forms large size particles with ions or other material to be removed and subsequently removes such material through efficient filtration means.

It is a still further object of this invention to provide preferred combining agents for combining with heavy metal ions and other contaminant materials to permit separation of such materials from water.

According to the invention, small particle size material such as heavy metal ions and/or other contaminant materials are removed from wastewater by combining the small particle size materials with a combining agent to form a soluble and/or insoluble bound material having a particle size sufficiently large to permit filtration of the wastewater with removal of the bound materials. In the preferred embodiment, the wastewater is wastewater from a commercial metal finishing operation such as metal plating and the combining agent is a metal in its oxide and/or hydroxide form and preferably oxides or hydroxides of iron and/or aluminum. Preferably a metal hydroxide is used to remove heavy metal ions from wastewater feeds which contain no greater than about 4000 parts per million of the heavy metal ions and contaminants. The metal hydroxide is used in a concentration of at least 1700 parts per million in the water to be filtered and preferably at least 2000 ppm, and in a molar ratio of from at least 1:1 and above with respect to moles of the materials to be removed.

Preferably the filtering step is carried out through an ultrafiltration anisotropic or skinned membrane which permits high filtering rates with small membrane area and relatively low pressure.

The method can be carried out in a batch operation or in a continuous operation which continuously produces filtered usable water and permits drawing off of the concentrate resulting from the filtration to an area where it can be treated for discharge to the environment or permits recovery of the metal ions.

It is a feature of this invention that the method can be carried out in an economical manner and permits reuse or discharge of the treated wastewater. Moreover, the heavy metal ions and other contaminant materials removed can be concentrated so that recovery or disposal of these metals is possible. The invention comprises using a combining agent to increase size of materials to be removed so that various filtration methods can be practically employed to recover or discharge cleansed water. The combining agent method when used with filtration devices and preferably ultrafiltration has significant advantages in permitting high fluxes with extremely good separation of pollutants such as heavy metal ions to reduce such pollutants to concentrations well below concentrations that could ever be obtained by precipitating materials as done in the prior art. In fact the pollutants are reduced to levels well below the water solubility limits of the materials removed. When a continuous system is used, large amounts of water can be reused in a closed continuous cycle. When such closed continuous cycle is used, a conventional polishing step can be incorporated in the cycle. The disposal volume of wastewater is reduced to an absolute minimum. The concentration of the metal ions and/or other contaminant material remaining after filtration is raised sufficiently to economically recover or destroy the materials. In the case of hexavalent chrome, a one step mechanical process combines the hexavalent chrome directly with the combining agent of this invention. This avoids the need to reduce chrome from $CR_6$ to $CR_3$ as is customarily done in a separate step in prior art methods.

Surprisingly it has now been found that by the use of a high concentration of a metal hydroxide combining agent, ultrafiltration can be used to achieve a product water flow through the filter which is higher than that achieved where a low concentration of metal hydroxide is used. It is thought that the excess of metal hydroxide permits the formation of a substantially crystalline precipitate rather than a more gelatinous one which often causes filter clogging. A steady product water flow can be obtained over long time periods when using the large excess of combining agent in accordance with this invention.

Brief Description of the Drawing

The above and other objects, advantages and features of the present invention will be better understood from the following specification when read in connection with the drawing which illustrates a preferred closed loop wastewater retreatment method of this invention.

Description of Preferred Embodiments

In the metal finishing and plating industry, rinse waters are used during processing which waters are often non-reusable unless treated to remove contaminating heavy metal ions and certain other contaminant or pollutant ions which are picked up by the water in the procedure. Common heavy metal ions and other anions and cations picked up in such wastewater including the following and tentative permissible discharge limits for the concentration of such ions which may be discharged to the environment are listed below:

|  | Effluent Parameter, mg/liter |
|---|---|
| phosphorus | 0.6 |
| aluminum | 0.2 |
| antimony | 0.3 |
| arsenic | 0.05 |
| barium | 1.0 |
| berylium | 0.3 |
| boron | 0.3 |
| cadmium | 0.1 |
| chromium Cr +6 | 0.05 |
| Cr +3 | 0.2 |
| Cr Total | 0.25 |
| cobalt | 0.3 |
| copper | 0.2 |
| iron | 0.5 |
| lead | 0.05 |
| manganese | 1.0 |
| nickel | 1.0 |
| silver | 0.05 |
| selenium | 0.3 |
| tin | 0.3 |
| zinc | 0.5 |
| gold | 0.3 |
| ammonia | 1.0 |
| mercury | 0.2 |
| cyanide Dest. by $Cl_2$ | 0.03 |
| Refract. | 0.5 |
| Total | 0.53 |
| fluoride | 2.0 |

The term "heavy metal ions" as used in the specification and claims includes all of the metals listed above in their pure ionic form and/or bound form as in chromates. The term "contaminants" as used in the specification and claims includes all of the nonmetallic materials listed above. In all cases, heavy metal ions and contaminants used herein include any unwanted materials in wastewater which are removable by the combining agents for this invention.

Segregated rinse waters can be obtained from a plating tank rinse and treated in accordance with the process of this invention. For example, in a gold plating procedure, the rinse water used can be segregated and treated in accordance with this invention to enable removal of gold ions from the wastewater. In this case, the concentrate remaining has highly concentrated gold ions without a large variety of other contaminant materials making separation of the gold ions from the concentrate readily achievable by conventional methods. Alternatively, rinse water following a variety of metal finishing steps can be combined to produce a wastewater having various combinations of many of the above heavy metal ions and other contaminants. In this case, the clear filtrate resulting can be reused and it is often most practical to destroy the heavy metal ions and other contaminants in the concentrate for efficient disposal using conventional methods.

In most cases, the nonmetallic ions and materials present in rinse wastewaters do not in any way affect the method of this invention. In fact, in some cases, the nonmetallic ions such as fluorides, chromates and cyanides can be removed along with the heavy metal ions during the process of this invention. In some cases, these nonmetallic ions or other particles do not prevent reuse of the wastewater if the heavy metal ions are first removed. In some cases, the nonmetallic contaminants if present, can combine with the combining agent to form complexes enabling removal in that manner. For example, ammonia can combine with preferred combining agents of this invention and is removed during the filtration step in many cases.

In the method of this invention, the heavy metal ions and other contaminants to be removed which may be any one or more of the above-mentioned materials listed are treated with a combining agent, to increase particle size of the contaminants which are normally small in particle size, to a size large enough to permit filtration of the unwanted contaminants from the wastewater. It is preferred to increase the particle size to a minimum of 10 angstroms and normally the particle size is increased to somewhere in the range of from 10 to 1,000 angstroms. Particle size is determined by the fact that the material so increased in size will not pass through a filter having pore sizes below 10 angstroms or below any specific particle size to which the contaminants are increased.

Particle size of the contaminant materials to be removed from the wastewater is increased by the use of a combining agent or combination of combining agents, which may be added to the wastewater or formed in the wastewater. The combining agent is preferably a metal in its hydroxide form although it may be in its oxide form, which has a large zeta potential with high absorption or adsorption properties. Preferred combining agents are formed from inorganic salts of metals and preferably iron and aluminum. It is believed that these inorganic salts when added to the wastewater adjusted to a basic pH form oxides and most likely hydroxides which act as the combining agents. In some cases, if the heavy metal ions are unionized with non-metals such as cyanide or fluoride, the cyanide and fluoride can be removed by filtration along with the heavy metal ions. Other inorganic oxides and hydroxides which create agglomerates large enough to be filtered and which have high absorption and/or adsorption properties to heavy metal ions and other contaminants of wastewater, due to electrical potential on their surface, zeta potential, hydrogen bonds, van-der wals bonds and other forces can also be used and include oxides and hydroxides of tin, copper, zinc, cadmium, nickel, cobalt, silicon, lead, barium, calcium, manganese and chrome.

When inorganic metal hydroxides or oxides are used as the combining agent, while they can be added directly to the wastewater to be treated, it is preferred to form them in the wastewater as by the addition of inexpensive inorganic metal salts. For example, chlorides, fluorides, sulfates, nitrates and the like of any one or more of the above metals can be added to the wastewater. Sulfates such as ferrous sulfate, ferric sulfate and aluminum sulfate are preferred due to ready availability and low cost.

The pH of the wastewater is preferably adjusted to a range of between pH 7.1 to pH 14 and preferably pH 8 to pH 12 to allow formation of the hydroxides. It is preferred to make the pH adjustment to a level as close to neutral as permissible for efficient separation of the contaminants. When high pH's are used, the filtered wastewater may have to be treated with acidic materials to lower the pH for discharge to the environment without causing basic contamination. In general, the higher the pH, the better the separation of unwanted contaminants although excellent separation and filtration can be obtained at pH's which are not above pH 9. The pH can be adjusted in the wastewater treated by the addition of inorganic hydroxides as known in the art. For example, sodium hydroxide, potassium hydroxide, and calcium hydroxide can be used. Calcium hydroxide is preferred again due to its ready availability and low cost.

It is preferred to employ a large excess of the combining agents used since it itself can be easily filtered and a large excess will assure binding of a maximized amount of heavy metal ions and other contaminants present in the wastewater. For example, molar ratios at least as high as 1:1 and preferably in the range of from 1:1 to 10:1 moles of combining agent to moles of metal salt or other contaminant to be removed are preferred. Thus, the inorganic salts when used to form the combining agents in the wastewater are added in molar ratios at least as high as 1:1 and preferably higher. In most cases, molar ratios of 1:1 are sufficient to permit removal of the heavy metal ions and contaminants and molar ratios above 10:1 are unnecessary although no detrimental effects are encountered by higher molar ratios.

In addition to using the molar ratios indicated above it is necessary to have a minimum amount of metal hydroxide present in order to have efficient ultrafiltration without blocking the filter. Crystalline precipitates are preferred to avoid rapid clogging of the filter membrane as often occurs in short time periods when gelatinous precipitates are used. At least about 1700 ppm and preferably at least about 2000 ppm of the combining agent in the aqueous solution to be filtered is used. There is no top limit to the concentration of the combining agent used except that the solution or suspension must remain capable of being pumped in ordinary commercial equipment.

The combining step can be carried out over a wide range of temperatures with a wide range of time periods possible. In most cases, the combining and binding of the heavy metal ions and other contaminants occur substantially instantaneously at room temperature although the temperature range can be varied greatly as from for example from 40° to 200° F as may be encountered in various commercial operations. The time period for the combining step can vary from a few seconds in certain continuous recycling operations to hours in batch operations although time periods of from 30 seconds to 15 minutes are normally sufficient.

After the combining step with resulting formation of large particle size materials, which can be soluble or insoluble or a combination of both, carried in the wastewater, conventional filtering can be used to complete the separation and remove the heavy metal ions from the wastewater. For example, filter paper can be used to remove insoluble large particle size materials formed while reverse osmosis can be used to remove soluble or insoluble large particle size materials used. However, according to the preferred embodiment of the invention, it is preferred to use ultrafiltration for the separation step.

Ultrafiltration is a process in which particles of small size are retained by a filter medium while solvent plus only certain accompanying low molecular weight solutes are allowed to pass through. In the preferred method, ultrafiltration using an anisotropic or skinned plastic membrane is found to give best results. Such ultrafiltration can be carried out at low pressures of from 9 to 1,000 psig or higher and preferably 10 to 150 psig. High flux rates are obtained even at low pressures. Preferably flux rates of from 30 to 1,000 gfd or higher (gallons, foot$^2$ of membrane per day) are used. As is known, higher pressures result in higher flux rates and high flux rates permit the use of smaller membrane surface area. Because of the low pressures and high flux rates obtained from anisotropic or skinned membranes, practical separation of the bound heavy metal ions and other contaminants can be obtained in commercial production. The porosity of the skinned membrane is designed to prevent passage of the enlarged particle size heavy metal ions and other contaminants in their bound form. In ultrafiltration, the filtration process is carried out on the top surface of the skin which reduces plugging of the filter allowing operation of the filter over long time periods.

The FIGURE is a schematic showing of a system 10 for continuous recycling of cleansed wastewater using the method of this invention in a metal plating procedure. The system comprises a rinse tank 12 which may contain one or more of the metal ions or other contaminants picked up by water rinsing the work piece. For example, fresh water going into the rinse tank may be used to wash a plated object so that contaminants are picked up by the clean water which is converted to wastewater having a high concentration of unwanted heavy metal ions and/or other contaminants. Suitable conduiting and pump or gravity feed means connects the rinse tank to a reacting tank 13 which is in turn connected through a pump means 15 to an ultrafiltration unit 14. The concentrate from the ultrafiltration unit can be bled off through conduit 23 to a reacting tank 17 where conventional procedures can be used to destroy the contaminants or separate them from the concentrate to enable reclaiming of the highly concentrated materials present. Alternatively, conduiting 18 can be used to direct the concentrate through line 19 back to the reacting tank 13. Conduiting 22 enables addition of reagents or make-up water if water is bled off to 17. Conduit 20 receives the cleansed water filtrate which can be returned for reuse in the rinse tank 12 by conduit 21 or discharged to the environment if desired.

In the system 10 shown, continuous recycling is illustrated as follows. Wastewater is obtained from rinse tank 12 and passed to the reaction tank at, for example, a rate of 10 GPM. The reaction tank has a reservoir volume of approximately 800 gallons. The wastewater contains high concentrations such as 100 parts per million of contaminant heavy metal ions. The reagent used to form the combining agent along with a pH adjustment means such as for example ferrous sulfate and calcium hydroxide are added to the reacting tank with the ferrous sulfate being in large excess as at an initial concentration in tank 13 of 5% and remains at at least a molar ratio of 1:1 to the metal ions and other contaminants present. The pH is adjusted to pH 9 and monitored with additional calcium hydroxide added when necessary to maintain the pH at pH 9. The reacting tank preferably contains a mixing device for assuring thorough mixing of the reactants with the wastewater although the continuous flow is often sufficient to enable uniform mixing. The contaminants and heavy metal ions react with the combining agent in the reacting tank and may be passed through pump 15 to the ultrafiltration unit 14 at a rate of 700 gallons per minute pressurized to about 50 psig. Cleansed water passes through the skinned membrane of the ultrafiltration unit at a rate of 10 gallons per minute and is returned to the rinse tank 12. The concentrate is returned to the reacting tank 13 at a rate of 690 gallons per minute through lines 18 and 19 permitting reuse of the reagent. If for example the rinsewater contains 100 parts per million of heavy metals, after 660 hours of continuous operation, 400,000 gallons of water will have been treated. At that time, the strength of the reject concentrate flowing through line 18 will be 5% and it can be bled off through line 23 and replaced by fresh water and reagent. The treatment of 400,000 gallons of rinsewater generates only 700 gallons of concentrate. If a segregated rinsewater containing only 1 or few contaminants has been used, it is relatively simple to obtain and reclaim the contaminant materials. Alternately, conventional methods can be used to treat the reject concentrate to render harmless and suitable for disposal.

Alternatively, the system 10 can be operated to continuously add make up water, calcium hydroxide and reagent such as ferrous sulfate while continuously bleeding concentrate through conduit 23 during continuous operation of the system. Thus, the operation can be continuous without the need to stop the system when a high concentration of contaminants is reached in tank 13. Since bleeding through line 23 is in small quantity such small quantities of concentrate can be treated for disposal or recovery over a prolonged time period.

Specific examples of the methods of this invention are given below and are not to be considered as limiting but merely illustrative of the invention.

EXAMPLE 1

200 ml of 0.01 molar (2980 ppm) aqueous sodium bichromate is mixed with 200 ml of water in a reaction tank so that the chromate concentration is 1510 ppm. The pH is raised to 9 by addition of calcium hydroxide. The solution is filtered through Whatman number 2 filter paper and analyzed. The filtrate is found to contain 1510 ppm bichromate. Thus no metal was removed.

In a modification of this example, 200 ml of 0.01 molar sodium bichromate solution is mixed with 200 ml of ferrous sulfate aqueous solution reagent and the pH adjusted to pH 9 with calcium hydroxide to form the combining agent which is believed to be ferrous hydroxide. The ferrous sulfate is added in an amount sufficient to bring the total solution to 0.0025 molar ferrous sulfate. The solution is allowed to react at room temperature (25° C) for 5 minutes and then passed through Whatman number 2 filter paper. Analysis indicates that the chrome (Cr) in the filtrate is at a value of 490 ppm equivalent to a bichromate value of 1510 ppm.

The steps given above are repeated except that the final concentration of ferrous sulfate reagent in the solution is increased with the following results obtained at the molar levels indicated:

| | | |
|---|---|---|
| 0.025 M reagent- | 55 ppm Cr → | 170 ppm bichromate |
| 0.037 M reagent- | 0.075 ppm Cr → | 0.23 ppm bichromate |
| 0.05 M reagent- | 0.003 ppm Cr → | 0.009 ppm bichromate |

Thus, at reagent to contaminant molar ratios of 5:1 and above, significant removal of contaminants occur.

EXAMPLE 2

0.01 molar aluminum sulfate in water is treated at room temperature. The pH is adjusted to pH 9 with sodium hydroxide and ferrous sulfate as reagent is added.

When the ferrous sulfate reagent is added in a molar ratio of 1:5 contaminant aluminum sulfate to ferrous sulfate reagent, on filtration through a Whatman number 2 filter paper, the filtrate water contains above 0.2 ppm of aluminum. When ferrous sulfate is added in a ratio of 1:10, the concentration of aluminum in the filtrate water is 0.018 ppm.

EXAMPLE 3

In this example, reactions are carried out at room temperature for periods of 5 minutes with stirring to uniformly mix the materials used. 100 ml of 0.01 molar zinc chloride in water is mixed with calcium hydroxide to raise the pH to pH 11. 100 ml of ferrous sulfate in aqueous solution are then admixed therewith in a molar strength of 0.005 and the aqueous solution is filtered through Whatman number 2 filter paper and analyzed. The filtrate is found to contain 0.27 ppm concentration of zinc.

When this example is repeated eliminating the ferrous sulfate reagent or using higher molar concentrations of the reagent, the following results are obtained:

| | Concentration of Zn in the filtrate |
|---|---|
| no reagent | 0.8 ppm |
| 0.01 molar reagent | 0.37 ppm |
| 0.05 molar reagent | 0.12 ppm |

| | Concentration of Zn in the filtrate |
|---|---|
| 0.1 molar reagent | 0 ppm |

EXAMPLE 4

In a series of tests, all at room temperature, a 50 ml chrome sulfate aqueous solution at 1000 ppm chrome was admixed with varying amounts of ferrous sulfate aqueous solution, water added to maintain a similar volume for all tests and the resultant solution alkalized with sodium hydroxide solution. In each test, the solution was then filtered through Whatman number 2 filter paper and the chrome concentration was determined. The following results were obtained:

| ml ferrous sulfate 10,000 ppm added | ml water added | Chrome concentration in filtrate (ppm) at pH | | |
|---|---|---|---|---|
| | | 8. | 9. | 11 |
| 35 | 15 | 0.03 | 0.03> | 0.5 |
| 32.5 | 17.5 | 0.13 | 1.8 | 3.2 |
| 30 | 20 | 0.29 | 2.8 | 5 |
| 25 | 25 | 4 | 38 | 5.2 |

EXAMPLE 5

Example 4 was repeated except that 50 ml aluminum sulfate aqueous solution at a concentration of 1000 ppm replaced the chrome sulfate with the results in the filtrate as indicated below:

| ml ferrous sulfate 10,000 ppm added | ml water added | Aluminum concentration in filtrate (ppm) at pH | |
|---|---|---|---|
| | | 9. | 11 |
| 35 | 15 | 0.005 | 0 |
| 32.5 | 17.5 | 0.022 | 0.029 |
| 30 | 20 | 0.018 | 0.069 |
| 25 | 25 | 0.035 | 0.075 |
| 0 | 50 | 70.2 | |

EXAMPLE 6

In this example, the continuous system 10 of the FIGURE was used. The ultrafiltration unit is Abcor commercial unit HFA 300 (FEG tubes) manufactured by Abcor Corporation of Cambridge, Mass. The unit contains 4 ultrafiltration tubular membranes having a diameter of 1 inch and a length of 5 feet. The feed to the reaction tank contains heavy metal ions contaminants as listed below. The pH is adjusted through conduit 22 and 19 to a pH of 9 with the addition of sodium hydroxide and ferrous sulfate is added in a large excess (about 25.00 parts per million). The solution is passed through the ultrafiltration tubes at a pressure of 50 psi and the pure water was collected and analyzed with the results given below:

| ANALYSIS OF THE "PURE WATER" | |
|---|---|
| Feed in ppm | product "Pure Water" in ppm |
| Aluminum 350 | 0.02 |
| Iron 1000 | 0.01 |
| Copper 1500 | 0.025 |
| Zinc 30 | 0.08 |
| Chrome 70 | 0.01 |

In this example the flow rate of pure water from line 20 was 700 ml per minute which is equivalent to 35 ml per minute per foot of ultrafiltration tube length. The pure water filtrate was drawn off and analyzed directly and the concentrate was passed directly to tank 17, thus the system was not operated on a continuous recycling basis, but only a single pass of the wastewater was made through the ultrafiltration unit.

EXAMPLE 7

In a specific example of using the system 10 of the FIGURE, line 21 is connected to a series of metal plating baths where the returning pure water is used as rinsewater. A manifold system collects the rinsewater from each of the baths and brings it to tank 12 to make the system a closed loop. In this example the Abcor unit of example 6 is again used as the ultrafiltration unit and flow rates are established at 10 gallons per hour from tank 12 to tank 13, and 60 gallons per minute at a pressure of 50 psi from tank 13 to the ultrafiltration unit. 10 gallons per hour of the filtrate is collected in line 20 and continuously passed through line 21 to the metal plating rinse baths. 3590 gallons per hour of concentrate is passed through lines 18 and 19 back to the reaction tank 13. Tank 13 is a 250 gallon tank containing 200 gallons of the starting rinsewater. At the start of the system, calcium hydroxide and ferrous sulfate are added through line 19 in an amount to bring the volume of wastewater in tank 13 to a pH of 9 and a value of 8400 ppm ferrous sulfate.

The system is operated at room temperature continuously for a period of 8 hours after which the system is shut down and bled through line 23 to obtain a concentrate in tank 17 having a concentration of 3% contaminants as opposed to a starting total concentration metal salts of 0.5%. When the system is run for 16 hours before shutdown the concentration of the concentrate bled off in tank 17 is 6%.

The table below indicates the makeup of the starting rinsewaters combined with the ferrous sulfate reagent fed into the tank 13 and the concentration of contaminants in the filtrate water taken off from the ultrafiltration unit at line 20:

| Tank Solution: | $Na_2Cr_2O_7$ | 275 ppm |
|---|---|---|
| | $NiSO_4$ | 275 ppm |
| | $Al_2(SO_4)_3$ | 100 ppm |
| | $CuSO_4$ | 275 ppm |
| | $ZnCl_2$ | 275 ppm |
| | $FeSO_4$ | 8400 ppm |
| Analysis of output: | | |
| pH = 8.7 | $Na_2Cr_2O_7$ | 0.002 ppm |
| 85 gallons | $NiSO_4$ | 0.03 ppm |
| | $Al_2(SO_4)_3$ | 0.01 ppm |
| | $CuSO_4$ | 0.04 ppm |
| | $ZnCl_2$ | 0.06 ppm |
| | $FeSO_4$ | 0.07 ppm |

EXAMPLE 8

In a series of tests 100 ml of aqueous ferrous sulfate solution was admixed with 100 ml of aqueous sodium bichromate (concentration of 2 ppm) solution. Concentrated sodium hydroxide is added to change the pH to pH 9. The combined solution is then filtered through Whatman number 2 filter paper. The analysis of the filtrate obtained at the ppm of the particular ferrous sulfate solution used in each batch is indicated below:

| 200 | ppm | FeSO$_4$ | 0.002 | ppm | Na$_2$Cr$_2$O$_7$ |
| 20 | ppm | FeSO$_4$ | 0.36 | ppm | Na$_2$Cr$_2$O$_7$ |
| 10 | ppm | FeSO$_4$ | 1 | ppm | Na$_2$Cr$_2$O$_7$ |
| 1 | ppm | FeSO$_4$ | 1 | ppm | Na$_2$Cr$_2$O$_7$ |

EXAMPLE 9

Example 8 is repeated using 100 ml of aqueous copper sulfate solution (concentration of 2 ppm) in place of the sodium bichromate of Example 8. Similar results were obtained in that copper was effectively removed at concentrations above 10 ppm concentration of the ferrous sulfate used.

EXAMPLE 10

100 ml of 0.1 M manganese sulfate aqueous solution was admixed with 100 ml of 0.01 M sodium bichromate aqueous solution at room temperature. 2 ml of sodium hydroxide was added to change the pH to pH 9. The total solution was filtered through a Whatman number 2 filter paper. The filtrate on analysis was found to contain 0.008 ppm sodium bichromate.

EXAMPLE 11

In this example a system such as system 10 of the FIGURE was used. However, the rinse tank is connected by a single pipe to the reacting tank 13, lines 18 and 19 carry the concentrate back to the reacting tank 13 and clear filtered water was drawn off through line 20 for discharge to the environment. A 15 gallon sample of a rinse water was placed in tank 12 and contained the following heavy metal ions:

| Fe | 40 | ppm |
| Ni | 27 | ppm |
| Zn | 0.6 | ppm |
| Cr | 108 | ppm |

110 grams of FeSO$_4$ was added. After 20 minutes the pH was adjusted to pH 9.2 using 56 ml of 50% NaOH. The mixture was then transferred into reacting tank 13 and pumped through the filtration unit 14 at a pressure of 10–15 psi. The analysis of the effluent was as follows:

| Fe | 0.035 | ppm |
| Zn | 0.04 | ppm |
| Cr | 0.01 | ppm |
| Ni | negligible | |

The product water flow through the ultrafiltration membrane was 1000 ml per minute per 0.8 ft.$^2$ of membrane area equal to 500 gf$^2$d. After the water level in the tank 13 was low, an additional 15 gallons of rinse sample containing 12.2 ppm aluminum was added. The product water in line 20 was found to contain 0.04 ppm Al.

EXAMPLE 12

The system of Example 11 was used. 90 gallons of combined rinse water containing:

| Fe | 1300 | ppm |
| Ni | 27 | ppm |
| Cu | 300 | ppm |
| Al | 300 | ppm |
| Cr | 300 | ppm |
| Zn | 38 | ppm | was added to the rinse tank.

The rinse water pH was adjusted to 9.3 by addition of 50% sodium hydroxide solution. This solution was transferred at a rate of 1000 ml per minute to a 25 gallon recirculating tank 13 which contained 15 gallons of 2000 ppm Fe aqueous solution in the form of iron hydroxide at pH 8.7–9.2. The solution is recirculated through a 3 foot long, 1 inch diameter ultrafiltration membrane tube in a filtration unit such as 14 at a rate of 23 gpm. The product water flow was at 1000 ml per minute which was collected. After most of the 90 gallons were run through the filter, with recirculation through line 18 and 19, the level of the sludge in the recirculating tank was 10 gallons and the product water was analyzed with the following result:

| Fe | 0.02 | ppm |
| Ni | negligible | |
| Cu | 0.06 | ppm |
| Al | 0.018 | ppm |
| Cr | 0.008 | ppm |
| Zn | 0.05 | ppm |

It should be noted that in this case while the initial rinse waters or wastewaters contained less than 3000 ppm of contaminants and heavy ions to be removed, the reacting tank has a buildup of levels well above that amount as water is removed and the concentrate recirculated to the reacting tank 13 through lines 18 and 19.

EXAMPLE 13

In a recirculating tank containing 100 ppm Fe ions and 60 ppm Zn ions in an aqueous solution, sodium hydroxide is added to adjust the pH to pH 9. The solution is pumped at a rate of 1000 ml per minute at 13 psi through a filtration unit such as 14. It is found that the flow rate drops to 280 ml/minute after 1400 minutes.

Using the same system except that the concentration of the Fe ions is adjusted to 2000 ppm, with the product water flow started at 1260 ml/minute, the flow was 1400 ml per minute after 1300 minutes. In both cases, the analysis of the product water issuing from line 20 was:

| 0.02 | ppm | Fe |
| 0.06 | ppm | Zn |

The correlation between original Fe ion concentration and product water flow is given below at the conditions of the preceding example, in a series of different iron ion concentrations:

| Fe Ion Concentration | Product Water Flow ml/min after 24 hours of passage through ultrafilter |
|---|---|
| 100 ppm | 280 |
| 1000 ppm | 350 |
| 1250 ppm | 400 |
| 1500 ppm | 500 |
| 1750 ppm | 670 |
| 2000 ppm | 1400 |

It should be noted that below 1500 ppm of iron combining agent, product water flow dropped off substantially in a 24 hour period to a level not acceptable for large scale commercial operations. On the other hand, at 2000 ppm and above, after 24 hours, product water flow is at an economically efficient and practical level. The limiting feature seems to be above 1700 parts per million of combining agent to obtain a product water flow per minute of at least 600 ml/min after 24 hours of use.

EXAMPLE 14

Using the system as recited in Example 11, 2000 ppm of Cr in the form of chrome hydroxide is present in the reacting tank 13. Pressure of 15 psi is used to create a water flow from the tank 13 to the filtration unit 14 at a rate of 120 ml per minute. When the concentration of the chrome is raised to 5000 ppm in the reacting tank 13 because of return of the concentrate through lines 18 and 19, the flow through the filter is found to be 880 ml per minute which leveled off after 72 hours of operation to 600 ml per minute. The product water contains no measurable amount of Cr ions. When contaminant iron ions are added to the tank 13 at a concentration of 200 ppm the product water at line 20 is found to contain 0.04 ppm FE after a single pass through the ultrafiltration membrane.

While specific examples of the present invention have been described above, such examples are not to be considered as limiting the present invention. Other filtration units can be used. In fact, other filtration methods including reverse osmosis may have application in certain embodiments so long as the particle size to which the contaminant ions are raised is sufficiently large to prevent passage through the filter. However, problems of clogging, low flux rates and the like can be encountered depending upon the particle size involved and the particular filtration system used. Ultrafiltration through skinned membranes gives significantly improved efficiency when rapid filtering times and continuous systems are desired.

While metal finishing such as plating and etching wastewaters have been discussed, other wastewaters or any contaminated water can be treated in accordance with this invention. For example, metal contaminants in polluted waterways can be treated by the method of this invention.

The combining agents formed may be insoluble or soluble in the wastewater being treated. Similarly, the product formed by reaction with the heavy metal ions and other contaminants to be removed may be soluble or insoluble or a combination of the two. It is an important feature of this invention that the combining agents used in the process of this invention, can act to remove heavy metal ions and other contaminants below the solubility of such materials. Thus the present invention enables reducing residual metal concentrations in wastewater below the solubility of corresponding metal hydroxides in water at corresponding pH.

When the inorganic metal salts are used as reagents they can be added directly to the wastewater as powders but are preferably added in aqueous solution form. The reagents can be added before, after or simultaneously with pH adjustment of the wastewater. In some cases no pH adjustment is necessary as when the wastewater to be treated is at a preferred pH value.

Ferrous sulfate is highly effective as the additive reagent to form the combining agents in removing the metal ions from wastewaters containing one or more of the contaminants listed below at the pH values given:

| | |
|---|---|
| aluminum sulfate | (pH 9) |
| zinc chloride | (pH 11) |
| copper sulfate | (pH 9) |
| chrome sulfate | (pH 9) |
| sodium bichromate | (pH 9) |
| nickel sulfate | (pH 9) |

Ferric sulfate is highly effective as the additive reagent to form the combining agents in removing metal ions from wastewaters containing one or more of the contaminants listed below at the pH values given:

| | |
|---|---|
| nickel sulfate | (pH 9) |
| nickel chloride | (pH 9) |
| zinc chloride | (pH 11) |

Aluminum sulfate is effective as the additive reagent to form the combining agents in removing metal ions from wastewaters containing one or more of the contaminants listed below at the pH values given:

| | |
|---|---|
| nickel sulfate | (pH 9) |
| nickel chloride | (pH 9) |
| chrome sulfate | (pH 9) |

Manganese sulfate is effective as the additive reagent to form the combining agent in removing bichromate from wastewaters.

However, all of the reactants, and combining agents of this invention when used in large excess, as above the minimum molar ratio of 1:1, can act to remove one or more heavy metal ions and/or other contaminants, as for example those listed in the specification, to obtain concentrations of the heavy metal ions and/or other contaminants in a filtrate at levels which can be at or below the concentration levels listed as tentative discharge limits in the specification. In most cases, the concentration of the heavy metal ions or other contaminants to be removed from water prior to the treatment of this invention is at a value of 1 part per million or higher. At concentrations in wastewater of below 1 part per million of contaminant, it is sometimes necessary to increase the molar ratio above the 1:1 value recited previously, to obtain highly efficient removal. Removal can be effective in highly concentrated wastewaters up to and beyond the solubility of the metal ions or other contaminants to be removed. Wastewater feeds from most conventional metal finishing and plating operations contain no greater than about 4000 ppm and often less than 2000 ppm of such ions and contaminants. Of course after operation of the system of this invention as in Example 7 or other cases where the concentrate from the ultrafilter is recycled to the reacting tank, the concentration of the heavy metal ions and contaminants in the reacting tank just prior to ultrafiltration is extremely high and can easily rise well above 4000 ppm over a normal time period of operation of the system. In some cases, the metal ions to be removed are present in the wastewater and dissolved therein, although, in other cases, as where the pH is basic, the metal ions may be partially in solution and partially in suspension. The combining agents of this invention allow removal of metal ions which may be in both suspended and dissolved form. Partial or complete removal can be made depending on the particular conditions used as for example reagents, molar ratios, pH, filtration and the like. In some cases, the filtered water from line 20 is polished as by passage through a deionizer to remove alkaline salts before reuse.

I claim:

1. A method of removing small particle size material in the form of heavy metal ions and contaminants of metal finishing and plating operations from wastewater feed containing no greater than about 4000 ppm of said heavy metal ions and contaminants, said method comprising,
combining said small particle size material with a combining agent at a pH of from 7.1 to 14 to form bound material having a particle size of at least 10 angstroms,
said combining agent being an inorganic metal hydroxide with the metal being selected from the group consisting essentially of iron, aluminum, tin, copper, zinc, cadmium, nickel, cobalt, silicon, lead, barium, calcium, manganese and chrome,
said combining agent being present in an amount of at least 1700 ppm and in a molar ratio of from 1:1 and above with respect to moles of the small particle size material yet in an amount permitting pumping of said wastewater,
and subsequently filtering said wastewater through an ultrafiltration skinned membrane at a flux at least as high as 30 gfd under pressure at least as high as 9 psig to separate said bound material from said wastewater.

2. A method in accordance with the method of claim 1 wherein said pH is basic,
said wastewater after filtration contains an amount of said small particle size material below the water solubility limits of said small particle size material, said small particle size material consists essentially of heavy metal ions from wastewater feeds containing no greater than about 4000 ppm of said heavy metal ions,
and said ultrafiltration pressure is in the range of from 9 to 150 psig.

3. A method in accordance with the method of claim 2 wherein said pH is in the range of from pH 8 to 12.

4. A method in accordance with the method of claim 3 wherein said small particle size material consists essentially of contaminant heavy metal ions resulting from a metal finishing procedure, and further comprising,
carrying out said combining in a reacting tank and filtering said wastewater in an ultrafiltration unit,
obtaining a concentrate from the ultrafiltration unit and recycling said concentrate to said reacting tank,
and obtaining the filtrate from the filtration unit and recycling said filtrate to said procedure, and passing wastewater from said procedure to said reacting tank with all of the steps being carried out continuously in a closed loop.

5. A method in accordance with the method of claim 4 wherein said combining agent is selected from the group consisting essentially of iron hydroxide and aluminum hydroxide.

6. A method in accordance with the method of claim 3 wherein said combining agent is formed by addition of a large excess of ferrous sulfate to said wastewater.

7. A method in accordance with the method of claim 3 wherein said small particle size material comprises a mixture of at least two different heavy metal ions.

8. A method in accordance with the method of claim 3 wherein said combining agent is selected from the group consisting of iron hydroxide and aluminum hydroxide.

9. A method in accordance with the method of claim 3 and further comprising,
carrying out said combining in a reacting tank and filtering said wastewater in an ultrafiltration unit,
obtaining a concentrate from said unit,
obtaining a filtrate from said filtration unit and recycling said filtrate to said metal finishing operation and passing wastewater from said operation to said reacting tank.

10. A method in accordance with the method of claim 9 wherein said combining agent is selected from the group consisting of iron hydroxide and aluminum hydroxide.

11. A method in accordance with the method of claim 10 wherein said combining agent is present in an amount of at least 2000 ppm in the wastewater.

12. A method in accordance with the method of claim 11 wherein a reaction tank is used to contain said combining agent and wastewater feed which form a reaction mixture,
said reaction mixture being passed to said ultrafiltration skinned membrane with the filtrate collected and the concentrate recycled to said reaction tank in a continuous method.

13. A method in accordance with the method of claim 2 wherein said small particle size material is originally present in said wastewater in an amount above 1 ppm, said small particle size material consisting essentially of contaminate heavy metal ions resulting from a metal finishing procedure and said combining agent being selected from the group consisting of iron hydroxide and aluminum hydroxide.

14. A method in accordance with the method of claim 13 wherein said combining agent is formed by the addition of ferrous sulfate in large excess to said wastewater.

15. A method in accordance with the method of claim 1 wherein said small particle size material comprises a mixture of at least 2 different heavy metal ions.

16. A method in accordance with the method of claim 1 wherein said inorganic metal hydroxide is iron hydroxide.

17. A method in accordance with the method of claim 1 wherein said metal hydroxide is aluminum hydroxide.

18. A method in accordance with the method of claim 1 wherein said wastewater feed is concentrated so that said combining agent is combined with heavy metal ions in said wastewater feed when said concentration of said heavy metal ions is above 2000 ppm.

19. A method in accordance with the method of claim 1 wherein said combining is carried out in a first tank to form an aqueous reaction mixture, transferring said reaction mixture to a second tank, filtering said wastewater in an ultrafiltration unit, obtaining a concentrate from the ultrafiltration unit and recycling said concentrate to said second tank, and continuously obtaining the filtrate from the filtration unit.

20. A method in accordance with the method of claim 1 wherein said combining agent is formed by addition of a metal ion selected from said group.

21. A method of removing small particle size material in the form of heavy metal ions and contaminants of metal finishing and plating operations from wastewater feed containing no greater than about 4000 ppm of said heavy metal ions and contaminants, said method comprising, combining said small particle size material with a combining agent at a pH of from 7.1 to 14 to form bound material having a particle size of at least 10 angstroms, said combining agent being an inorganic metal hydroxide with the metal being selected from the group consisting essentially of iron, aluminum, tin, copper, zinc, cadmium, nickel, cobalt, silicon, lead, barium, calcium, manganese and chrome, said combining agent being present in a molar ratio of from 1:1 and above with respect to moles of the small particle size material yet in an amount permitting pumping of said wastewater, and subsequently filtering said wastewater through an ultrafiltration skinned membrane at a flux at least as high as 30 gfd under pressure at least as high as 9 psig to separate said bound material from said wastewater.

22. A method in accordance with the method of claim 21 wherein said combining agent is formed by addition of a metal ion selected from said group.

23. In a method of removing heavy metal ions from aqueous solutions obtained from metal finishing and plating operations, the steps comprising, combining a metal hydroxide with the metal ions of said solution at a pH of from 8 to 12 with said metal of said metal hydroxide being present in said solution in a concentration of at least 1700 ppm and said metal hydroxide being present in said solution in a ratio of at least 1:1 with respect to said heavy metal ions, to form bound material, and filtering said combined solution through an ultrafiltration skinned membrane at a flux at least as high as 30 gf$^2$d under pressure at least as high as 9 psig to separate said bound material from said solution.

24. A method in accordance with the method of claim 23 wherein said metal hydroxide is formed by the addition of a large excess of ferrous sulfate to said aqueous solution.

* * * * *